C. C. STELLE.
SAP SPOUT.
APPLICATION FILED APR. 18, 1912.
1,042,834.
Patented Oct. 29, 1912.
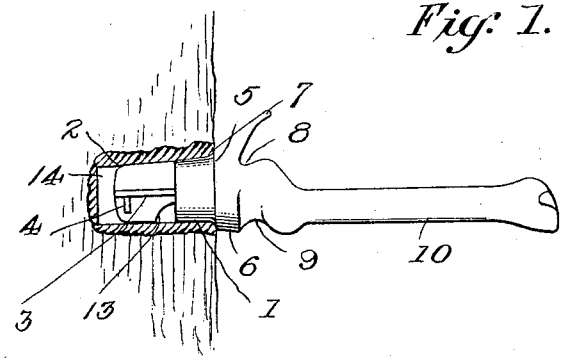
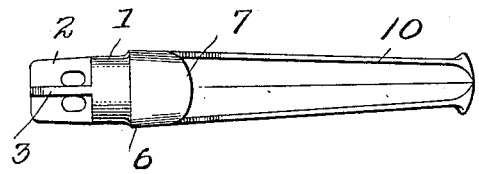
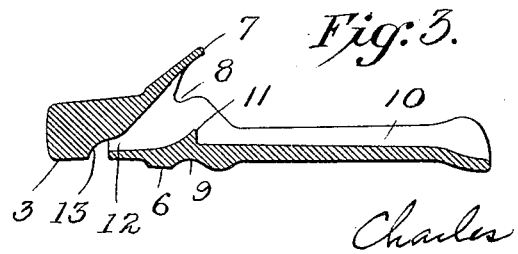
Witnesses
Jos. H. Collins
A. L. Mills
Inventor
Charles C. Stelle
By Percy B. Hills
Attorney

UNITED STATES PATENT OFFICE.

CHARLES C. STELLE, OF NEW YORK, N. Y.

SAP-SPOUT.

1,042,834.  Specification of Letters Patent.  Patented Oct. 29, 1912.

Application filed April 18, 1912. Serial No. 691,603.

*To all whom it may concern:*

Be it known that I, CHARLES C. STELLE, a citizen of the United States, residing in the borough of Brooklyn, city of New York, State of New York, have invented new and useful Improvements in Sap-Spouts, of which the following is a specification.

My invention relates to sap spouts, and has for its object to provide an improved construction of the same whereby the sap trap formed therein will be protected from the wind and from ingress of water running down the tree, and without interfering with the application thereto of the bucket supporting bail in the most desirable position close to the tree body.

In the accompanying drawing: Figure 1 is a side elevation of my improved device shown positioned in a tree to be tapped. Fig. 2 is a top plan view of the device. Fig. 3 is a central vertical longitudinal sectional view of the same.

Similar numerals of reference denote corresponding parts in the several views.

In the said drawing in which the device is shown as formed integrally of a single piece of material, preferably metal, the reference numeral 1 denotes the head of the device, the same being formed circular in cross section and slightly tapered inwardly where it merges into horizontally and vertically disposed fins 2, 3, which may, if desired, be provided on the under side of the horizontal fins 2 with strengthening ribs 4. The head 1, which is elongated somewhat, is formed with a tapered shoulder 5 and is enlarged somewhat at 6 as shown, the upper side of said enlargement merging into an upwardly and outwardly projecting lip 7 undercut at 8 to receive the eye of a wire hook for supporting the sap receiving bucket, said eye lying in the groove 9.

The device is provided with the usual sap trough 10, and within said trough, and disposed beneath the projecting lip 7, is a transverse partition 11, the orifice or hole 12 for the discharge of the sap into the trough 10 passing through the head 1 and being disposed to lie at its open rear end slightly below the upper edge of the partition 11, the under side of vertical fin 3 being cut away at 13 to give room for the flow of the sap into said orifice 12.

In use the device is driven into the tap hole 14 previously formed in the tree, and which may be either horizontally disposed or formed at a slight angle downward and outward, until the shoulder 5 is forced into the tree bark, as shown in Fig. 1. The partition 11 will now form a dam or trap for the sap, which will accumulate behind it until it discharges into trough 10 by overflowing said partition, the level of the sap being thus constantly maintained above the upper edge of the orifice 12, thus effectually preventing drying of the tap hole 14 and consequent contraction of the sap pores or ducts therein. By providing the device with the projecting lip 7 overlying the partition 11 I guard against water running down the outside of the tree entering the sap trap formed by said partition 11, and further protect the same against high winds which tend to blow the sap out of said trap and thus expose the tap hole to the atmosphere.

The elongated head 1 of the device affords a firm bearing in the tree and reduces to a minimum the probability of the weight of the supported bucket dragging the spout from its position, this result being aided by the disposition of the bucket supporting bail in the undercut portions 8 close to the tree body.

Having thus described my invention, what I claim as new and desire to secure by Letters Patent is:

A sap spout, comprising a head, a sap trough provided with a transverse partition forming in conjunction with a sap orifice in said head a trap for the sap, and a projecting lip on said head overlying said partition and trap and undercut at its sides to receive a bucket supporting bail.

In testimony whereof, I have hereunto set my hand in the presence of two subscribing witnesses.

CHARLES C. STELLE.

Witnesses:
 A. W. PEUCHOEN,
 REMSEN S. MILLS.

Copies of this patent may be obtained for five cents each, by addressing the "Commissioner of Patents, Washington, D. C."